Oct. 25, 1960 W. G. ABRAHAM ET AL 2,958,004

HIGH FREQUENCY TUBE

Original Filed July 27, 1953 5 Sheets-Sheet 1

INVENTORS
WAYNE G. ABRAHAM &
SIGURD. F. VARIAN
BY Paul B. Hunter
ATTORNEY

HIGH FREQUENCY TUBE

INVENTORS
WAYNE G. ABRAHAM &
SIGURD F. VARIAN
BY Paul B. Hunter
ATTORNEY

Oct. 25, 1960 W. G. ABRAHAM ET AL 2,958,004

HIGH FREQUENCY TUBE

Original Filed July 27, 1953 5 Sheets-Sheet 3

INVENTORS
WAYNE G. ABRAHAM &
SIGURD F. VARIAN

BY Paul B. Hunter
ATTORNEY

INVENTORS
WAYNE G. ABRAHAM &
SIGURD F. VARIAN
BY Paul B. Hunter
ATTORNEY

Oct. 25, 1960 W. G. ABRAHAM ET AL 2,958,004

HIGH FREQUENCY TUBE

Original Filed July 27, 1953 5 Sheets-Sheet 5

INVENTORS
WAYNE G. ABRAHAM &
SIGURD F. VARIAN
BY Paul B. Hunter
ATTORNEY 2,958,004

HIGH FREQUENCY TUBE

Wayne G. Abraham, Palo Alto, and Sigurd F. Varian, Menlo Park, Calif., assignors to Varian Associates, Palo Alto, Calif., a corporation of California Original application July 27, 1953, Ser. No. 370,568, now Patent No. 2,879,440, dated Mar. 24, 1959. Divided and this application Dec. 22, 1958, Ser. No. 782,091
10 Claims. (Cl. 315—39)

This invention relates generally to high frequency velocity modulation tubes such as are useful in connection with high power applications and the invention has reference, more particularly, to a novel high power, high frequency amplifier tube of the klystron type suitable for television transmitters and other such uses as in the field of diathermy, high frequency heating, etc. Heretofore, it has been difficult or impossible to produce high power transmitters for use in high frequency television inasmuch as ordinary grid controlled thermionic tubes cannot be built having large power outputs in the high frequency range of the order of 475 to 890 megacycles covering TV channels 14 through 83 or thereabout.

The novel tube of the present invention not only is capable of supplying desired powers of the order of 15 kilowatts and higher in the frequency range desired but has stable operating characteristics including a substantially fixed frequency output which is essential in the television transmitter field.

Accordingly, it is the principal object of the present invention to provide a novel high frequency tube of the klystron type capable of high power output for use in such fields as the television transmitter field, diathermy field, the heating field and others, the said tube having great mechanical and thermal stability resulting in efficient operation under all operating conditions.

Another object of the present invention is to provide a novel multicavity amplifier tube of the klystron type so constructed and arranged as to provide for large output powers of continuous operation over long periods of time with high gain and with high stable operating characteristics.

Still another object of the invention is to provide a novel cathode structure utilizing a bombarded cathode button, the beam output of which is stable and substantially uniform over the entire button area due to the novel construction of the cathode.

Another object of the present invention is to provide a novel coaxial line-evacuated cavity resonator coupling whereby fragile vacuum seals are protected against mechanical injury.

Other objects and advantages of the present invention will become apparent from the following description and drawings taken in connection with the appended claims.

In the drawings,

Fig. 1 is an elevational view of the novel tube of this invention with the focusing coils shown in section, Fig. 2 is a sectional view taken along line 2—2 of Fig. 1, Fig. 3 is a sectional view taken along line 3—3 of Fig. 1, Fig. 4 is a sectional view taken substantially along line 4—4 of Fig. 5, Fig. 5 is a plan view of a tube embodying the present invention, Fig. 6 is a fragmentary sectional view taken substantially along line 6—6 of Fig. 5, Fig. 7 is a fragmentary sectional view taken substantially along line 7—7 of Fig. 5, Fig. 8 is an external plan view of the tube collector, Fig. 9 is a sectional view taken along line 9—9 of Fig. 8, Fig. 10 is a sectional view taken along the line 10—10 of Fig. 9, Fig. 11 is a sectional view with parts broken away of the cathode structure, Fig. 11*a* is a detail of a possible modification, Fig. 12 is a view looking in the direction of the arrows 12—12 of Fig. 11

Similar characters of reference are used in all of the above figures to indicate corresponding parts.

Figures 1, 2, 3, 7:
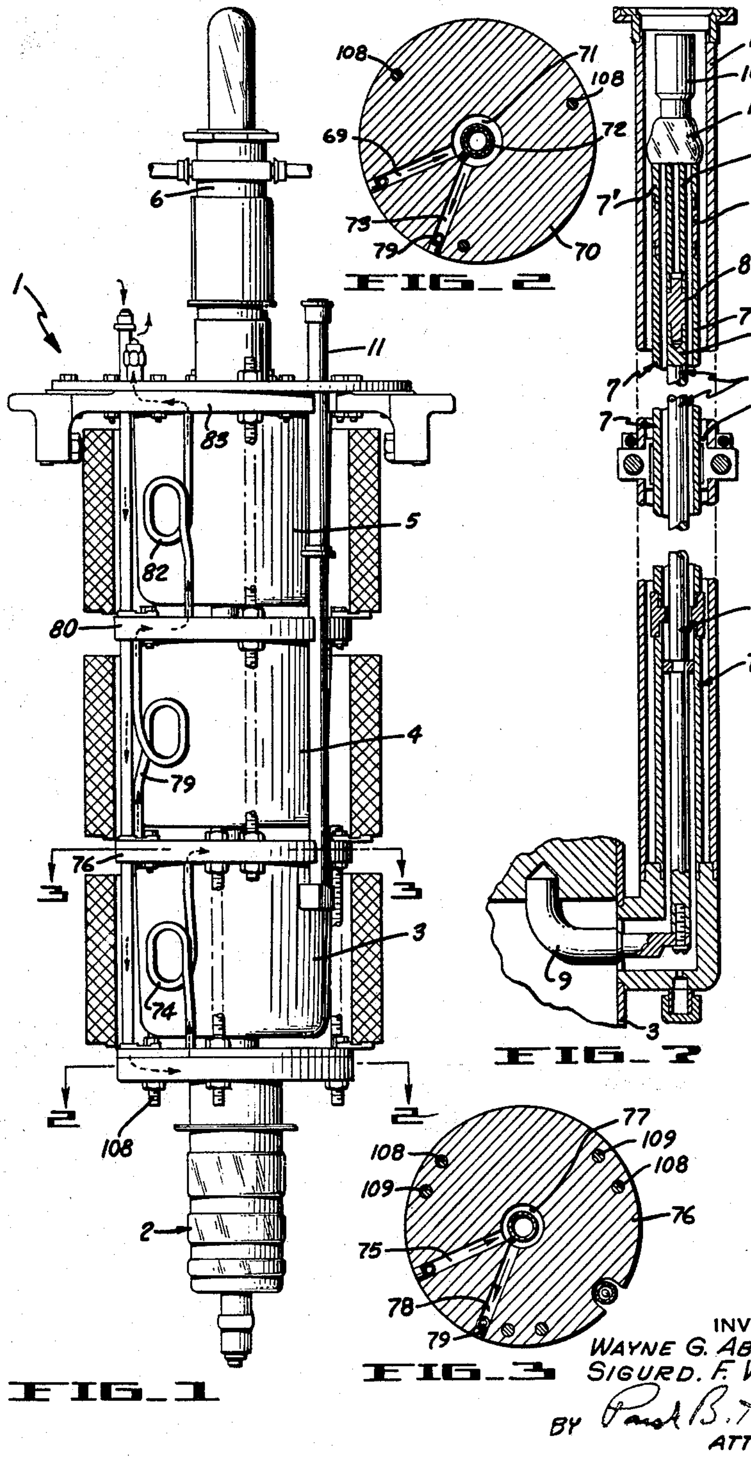

Referring now to the drawings, the novel tube 1 of this invention comprises a cathode structure 2, resonators 3, 4 and 5, and a collector 6. Signal energy to be amplified is supplied to the first resonator 3 via a concentric line input (see Fig. 7) consisting of an outer conductor 7 and inner conductor 8 terminating at its inner end in a loop 9 within the cavity of resonator 3. This inner conductor 8 terminates at its outer end in an enlarged portion 10 which serves as an inner conductor of a concentric line having an outer conductor 11. A vitreous seal 12 as of quartz or glass is provided between the inner conductor 8 and outer conductor 7 near the enlarged end portion 10. The outer conductor 11 extends downwardly over the outer conductor 7 and not only serves to protect the seal 12 and input line structure 7, 8 against mechanical injury but also is provided with a shorting section at 13 which section is located substantially a half wave length of the operating frequency from the seal 12 to thereby establish a potential minimum between the seal and the outer conductor 11 during the operation of the tube whereby an electrical short is interposed between conductors 7 and 11 at the seal hence eliminating the necessity of a mechanical connection between conductors 7 and 11 at the seal thus protecting the latter against cracking and a consequent loss of vacuum within the resonator cavities bearing in mind that the seal 12 serves to maintain vacuum between the inner conductor 8 and the outer conductor 7 and within the cavity resonators.

To further protect the seal 12 against breakage this seal is shown connected to portions of conductors 7 and 8 made of material having a low temperature coefficient of expansion similar to that of the seal itself. For example, the annular sections 7′ of outer conductor 7 and 8′ of inner conductor 8 to which the seal 12 is adhered may conveniently be made of Kovar or similar low temperature coefficient material, whereas the adjoining sections 7″ and 8″ of these members may be made of steel which latter sections in turn are coupled to sections 7‴ and 8‴, which are of a good conductor such as copper so that this good conductor of relatively high thermal expansion is connected to the seal 12 of low thermal expansion through the intermediary of steel and Kovar sections. A suitable concentric line supply lead such as a flexible line is adapted to be coupled to the input concentric line 10, 11 for supplying input signal to the tube in use.

The power output connection for the tube comprises a concentric line (see Fig. 6) having an inner conductor 15 shown as hollow and of good conducting material such as copper. In order to stiffen this inner conductor a central non-magnetic stiffener or rod 16 is provided as of tungsten. The inner end of the conductor 15 terminates in a loop 17 provided in the output resonator 5, whereas the outer free end of the conductor 15 terminates within a bulbous vitreous seal 18 that is adapted to project into an output waveguide 19 for radiating energy thereinto. The inner conductor 15 is surrounded by an outer conductor 20 which is shown made up of three sections, a Kovar section 21, a steel section 22 and a copper section 20, the Kovar section 21 having the bulbous seal 18 fused thereto around the periphery thereof. A spacer bead 23 as of quartz is shown carried within the steel section 22 for centrally positioning the inner conductor 15 therewithin.

In order to avoid a mechanical connection between the conductor 21 and the waveguide 19 at the bulb 18 which might result in mechanical injury to the bulb this region is located at a potential minimum by use of a half wave trap as in the case of the tube input line. This half wave trap is set up by an outer tubular conducting member 24 surrounding the outer conductor 20 and having an annular shorting member 25 at its lower end contacting both this tubular member and the outer conductor 20. The shorting member 25, being spaced a half wave length from the juncture of the seal 18 with outer end of tubular section 21, provides a potential minimum at such line of juncture thereby enabling the output line to carry heavy loads while connected to the waveguide 19 without injury to the glass seal.

Figures 11, 11A, 12:
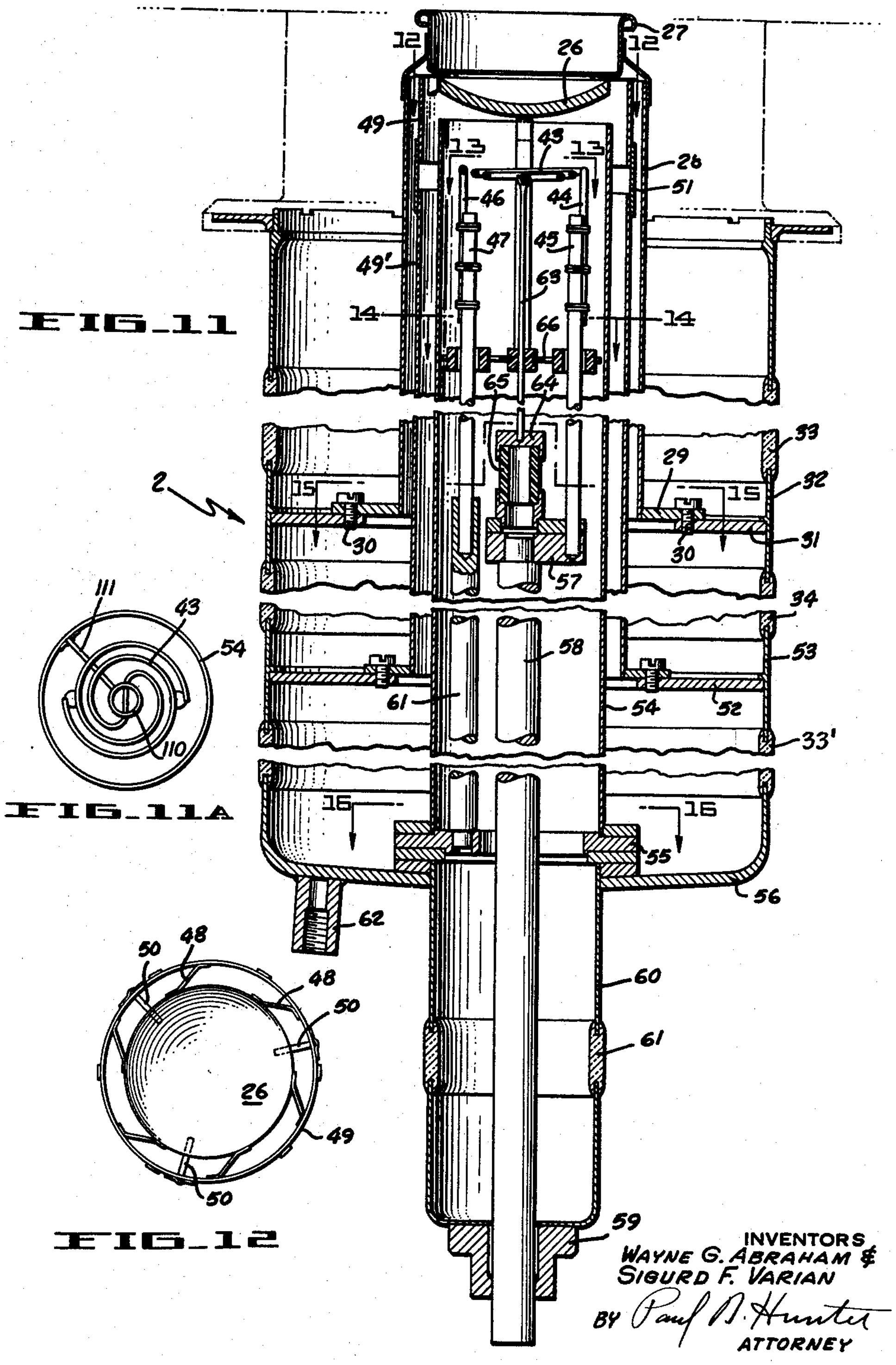

The cathode structure 2 is shown in detail in Fig. 11 and comprises preferably a concave focusing cathode button 26 having an annular focus shield 27 positioned slightly in front of the same and carried by a cylindrical metallic support 28 which also serves as a heat shield, the said support having its lower end fixed to an annular conducting flange member 29 that is attached as by screws 30 to a conducting ring member 31 supported upon an annular contact member 32 of Kovar or similar material having a coefficient of linear expansion close to that of glass. The contact member 32 is shown sealed at its upper and lower peripheries to glass seals 33 and 34 and serves to receive a suitable potential for application to focus shield 27. The focus shield 27 cooperates with the cathode button 26 which may be of tantalum or thoriated tungsten, for example, for projecting an electron beam through drift tubes (see Fig. 4) 35, 36, 37, 38 before the beam finally reaches the tube collector 6. The successive drift tubes provide gaps 40, 41 and 42 therebetween so that the electron beam can coact with the electrical field portions of the standing electromagnetic waves within the cavities 3, 4 and 5.

Figures 4, 5, 6:
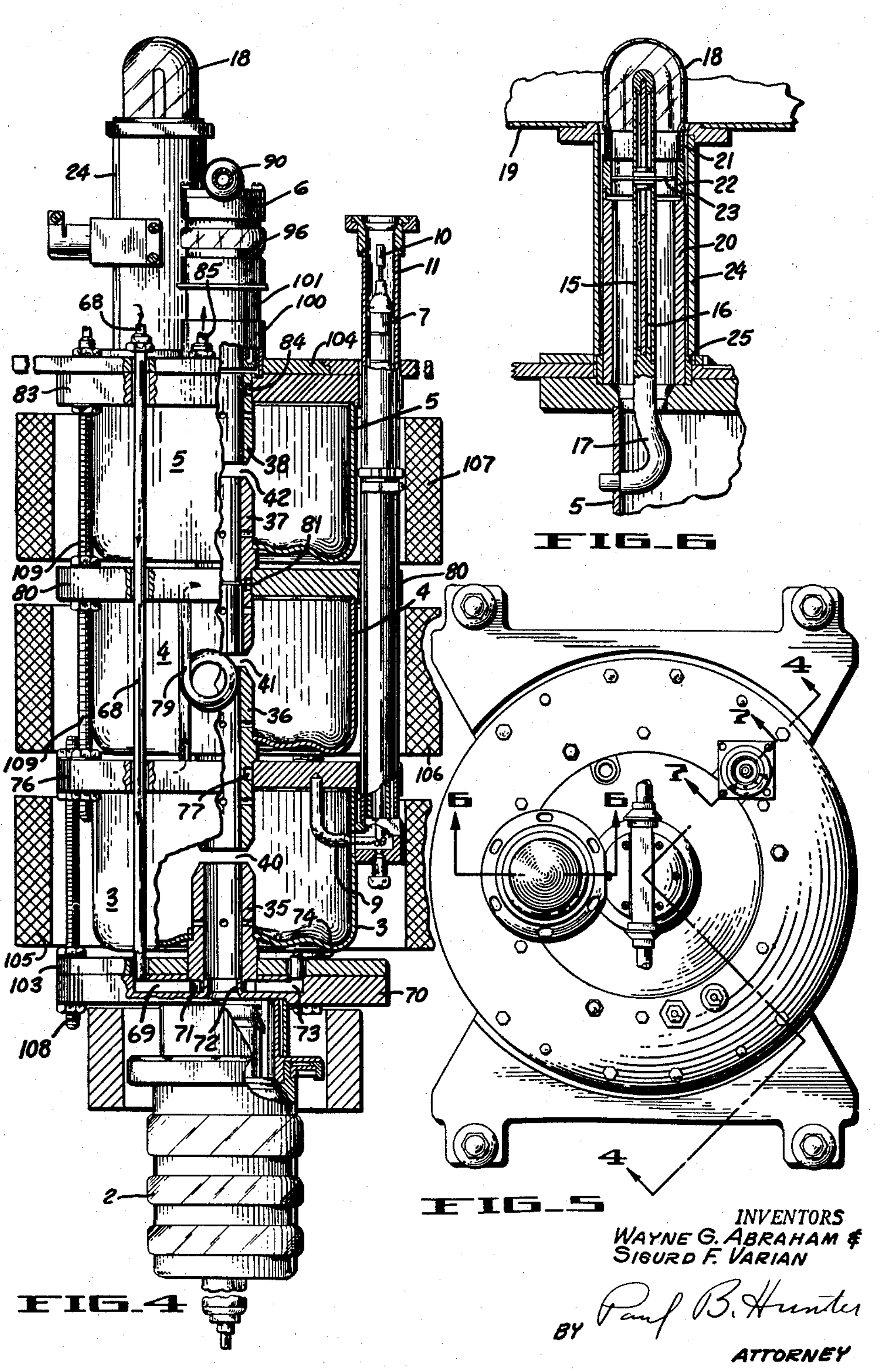

The drift tubes 35, 36, 37 and 38 are so constructed and arranged as to provide the gaps near the center of the lengths of the successive cavities as in this position the best distribution of electrical field is obtained providing for the most effective coaction between the beam and the standing field and enabling the respective gaps to be made as short as possible, the opposed drift tube ends being beveled thereby reducing the probability of multipactor action, i.e. the production of secondaries by tendency of the beam to expand and strike against the ends of the drift tubes. Preferably, the cavities' lengths are made relatively long as shown in Fig. 1 with the gaps located near the center of the length of the cavities as shown in Fig. 4 to provide an intense electrical field component for coaction of the beam thereby also providing cavities of high shunt impedance and enhancing the tuning range of the cavities.

Figures 13, 14, 15, 16:
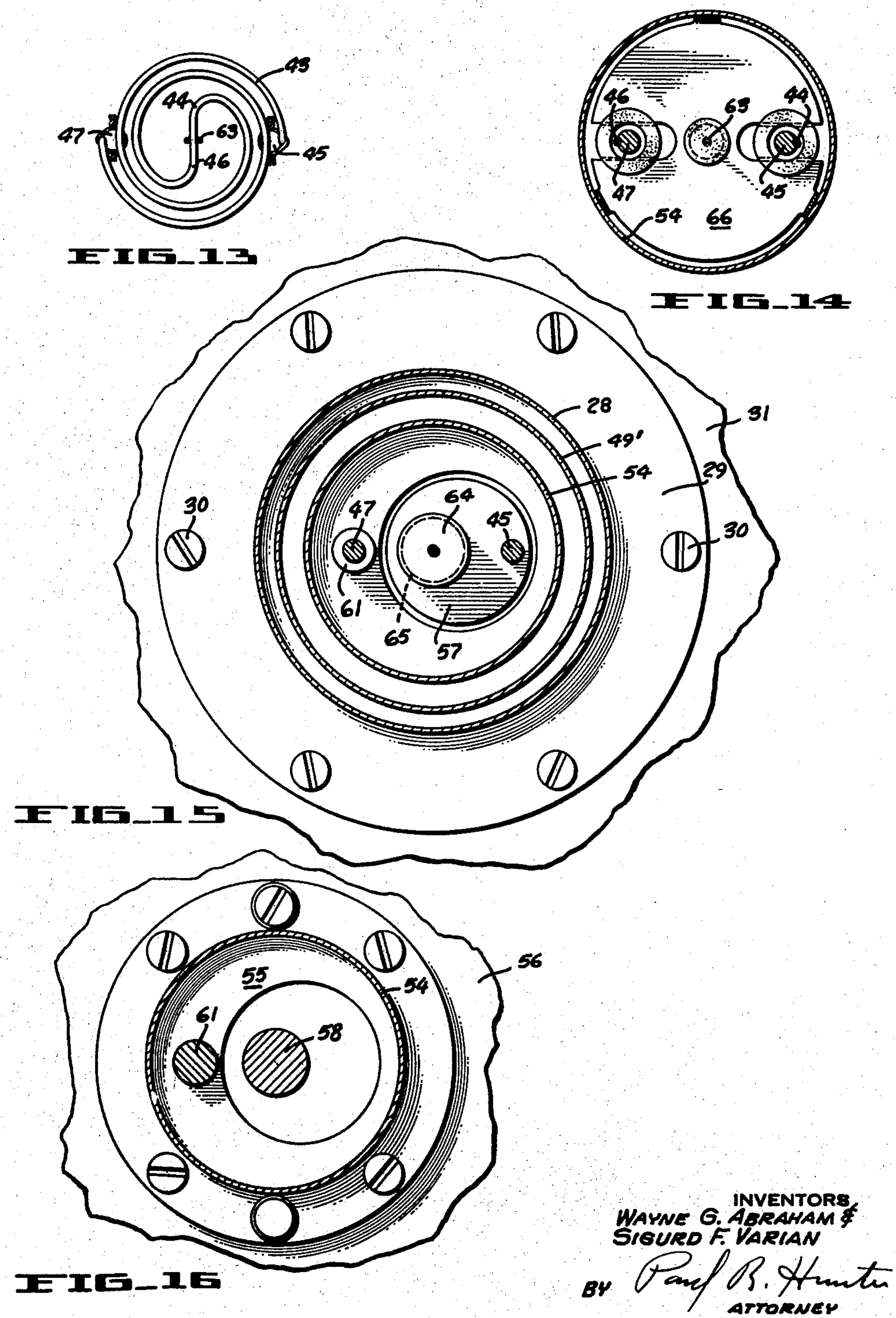
Fig. 13 is a view looking in the direction of the arrows 13—13 of Fig. 11.
Fig. 14 is a sectional view taken along lines 14—14 of Fig. 11.
Fig. 15 is a sectional view taken along the lines 15—15 of Fig. 11.
Fig. 16 is a sectional view taken along the lines 16—16 of Fig. 11.

Referring again to Fig. 11, the cathode button 26 is adapted to be heated by electron bombardment from a filament 43. This filament is better shown in Fig. 13 and has the shape of a double spiral. Thus starting at the center of the filament one spiral portion 44 can be traced as extending upwardly on the drawing and in a clockwise direction and terminating in a connection with terminal post 45, whereas the other spiral portion 46 can be traced as extending downwardly and in a clockwise direction and later interleaved with spiral portion 44 and terminating in terminal post 47. The pitch of the spiral portions 44 and 46 varies with the radial position of the same so that the convolutions near the periphery of the filament are closer together than they are near the center thereof. This is done in order to provide for uniformity of heating of the button 26, bearing in mind that the annular area increments heated increases as the square of the radius. If the pitch of the spirals were the same throughout the diameter of the filament, the inner porion of the button 26 would be overheated resulting in rapid deterioration of the button due to the overheating of such inner portion and rapid evaporation of metal from the same. This is also objectionable because the metal so evaporated drifts toward and collects on the accelerating electrode or plate 70 and thereafter flakes off in relatively large pieces tending to cause the tube to arc-over in use. Thus heretofore in using an ordinary spiral filament the metal of the button such as tantalum would become overheated in the central area of the button forming a hot spot resulting in rapid evaporation of the tantalum at this spot which evaporating metal passes to the plate 70 and collects thereupon in the form of fibers, which fibers when attaining a certain size tend to break off and produce arc-overs in the tube thereby rendering the tube inoperative during such arc-overs.

It is desirable that the cathode button 26 be centered with respect to the focusing shield 27 and with respect to the drift tubes 35 through 38 in order to obtain efficient operation of the tube. In order to enable the button 26 to be properly centered at all times regardless of expansion and contraction of this button due to temperature changes the same is shown supported by a plurality of substantially tangentially extending resilient fingers or struts 48 as of tantalum which are spaced around the periphery of the button and tangentially secured at their inner ends thereto as by welding and similarly secured at their outer ends to an annular supporting member 49 which also acts as a heat shield. The fingers 48 extend in a generally tangential direction so as to hold button 26 centrally within member 49 regardless of temperature changes. Thus, as the button 26 becomes hot and expands the fingers 48 flex slightly permitting such expansion without misaligning the button with respect to the resonator gaps. Such expansion and contraction of the button or strut 26 may cause a slight rotation of this button but this does not vary its axial position. Small rods 50 are shown pivotally mounted on member 49 and extend into openings in the button to aid the fingers 48 in supporting the button.

The annular shield member 49 is shown supported upon a cylindrical member 49' as by links 51, which links prevent excessive heat from reaching member 49' from member 49. Member 49' also acts as a secondary heat shield and has its lower end carried by a ring member 52 that is supported upon an annular contact member 53 which contact member has an upper periphery sealed to the seal 34 and its lower periphery sealed to seal 33'. Positioned concentrically within cylindrical supports 28 and 49' is a cylindrical heat and focusing shield 54. The upper free end of this shield is positioned in the proximity of button 26 and serves to converge the bombarding beam from filament 43 upon the under side of button 26. By reducing the height of the shield 54 its focusing or converging action can be lessened thereby controlling the spread of the bombarding beam so as to obtain the most efficient heating of the under surface of the button 26.

In order to further aid in preventing excessive heating of the central area of the button 26 a defocusing member 110 shown in Fig. 11*a* as a wire loop may be inserted between the filament 43 and button 26. This loop has an extension 111 extending downwardly between the turns of filament 43 and over to shield 54 to which it is fixedly attached and supported. The presence of loop 110 serves to reduce the number of electrons striking the central portion of the button 26 and cooperates with shield 54 in establishing a more or less annular beam for striking the button around the outer lower surface thereof, thereby heating the radial outer portions of the button more than its central portion resulting in uniform heating of the button. Thus, the novel configuration of filament 43 plus the proper focusing action by the member 54 and member 110, when employed, causes the button 26 to be uniformly heated over its entire area resulting in low evaporation of the button material and long tube life. The lower portion of the shield 54 is shown supported upon an annular conducting member 55 which in turn is carried by the cup-shaped casing bottom 56. The peripheral upper edge of the casing bottom 56 is sealed to the seal 33'.

The filament supporting post 45 is shown carried by a conducting header or transverse arm 57 that in turn is mounted upon the upper portion of a central terminal rod 58 which extends downwardly through a central aperture in casing bottom 56 through a cylindrical base member 60 depending from bottom 56 and through a base member 59 for connection to one side of a filament supply. The cylindrical member 60 is shown insulated from members 58 and 59 by seal 61. The other filament supporting post 47 is shown carried by a rod 61 extending parallel to rod 58 at one side thereof, the lower end of rod 61 being fixed to conducting member 55. A terminal post 62 connected to the bottom member 56 serves as an electrical connection via bottom 56, member 55, rod 61 and post 47 to the other terminal of filament 43.

It will be noted that the focus shield 27 is connected via annular contact member 32 to a suitable source of focusing potential. However, if desired, the cylindrical support 28 for this focus shield could be supported and electrically connected directly upon supporting member 49', thereby doing away with the necessity for contact ring 32 and one of the seals 33 and 34. In this case, however, the focus shield would be at the same potential as the cathode button. The central portion of the filament 43 is shown supported upon the vertical rod 63 as of tungsten which in turn is carried by a cap 64 supported on an insulating sleeve 65 that in turn is supported upon the header 57. The rod 63 is shown steadied by an insulator in transverse partition 66 carried by member 54 which partition also serves at a heat shield.

Owing to the use of concentric sleeves 28, 49' and 54 for supporting the focus shield, cathode button, and for steadying the filament the resulting cathode assembly is extremely rugged and reliable in use and reduces microphonics to a minimum.

The resonator drift tubes are adapted to be cooled by use of circulating fluid which flows downwardly through pipe 68 (see Fig. 4) into a transverse duct 69 provided in cylindrical accelerating plate 70 as of copper, through an annular duct 71 in drift tube 35 surrounding the throat member 72 of this plate, through a second transverse duct 73 and then outwardly through a pipe 74 having a loop therein as shown in Fig. 1 and from this pipe cooling fluid flows into a transverse passage 75 (see Fig. 3) in a cylindrical plate 76 constituting the rigid upper end or thick wall portion of resonator 3 and supporting drift tube 36. Cooling fluid then flows within an annular passage 77 provided in drift tube 36 and outwardly through passage 78 to pipe 79 which is similar to pipe 74 and which supplies the cooling fluid to a second cylindrical plate 80 forming the rigid end of resonator 4 and carrying drift tube 37. Within plate 80 the cooling fluid similarly flows around an annular passage 81 within the drift tube 37 and thence flows outwardly through pipe 82 similar to pipes 74 and 79 and thence into a third cylindrical plate 83 forming the upper rigid end of resonator 5, through the annular passage 84 within drift tube 38 carried by this plate and thence outwardly through an exit pipe 85. Thus, in use, over-heating of the drift tubes 34, 36, 37 and 38 is prevented by the circulating fluid flowing therearound so that the tube is maintained in a cool condition even while delivering exceedingly high power.

Figure 9:
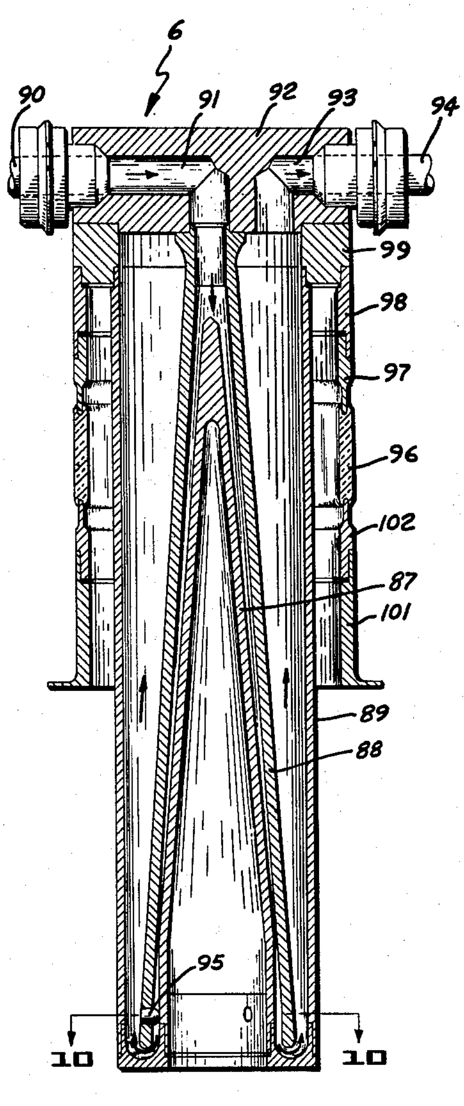
Figure 8:
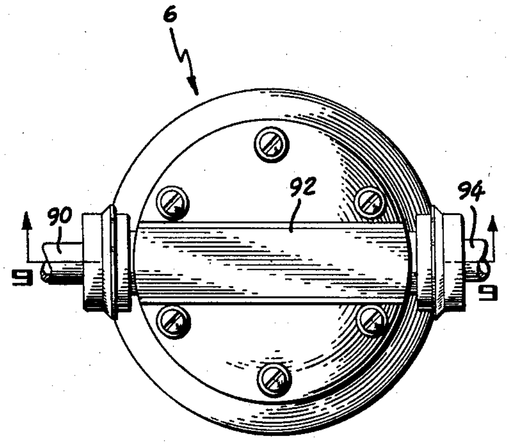
Figure 10:
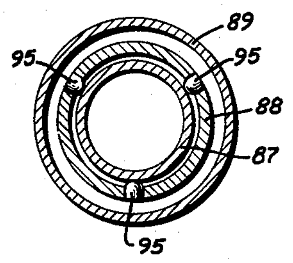

After leaving the last drift tube 38 the beam enters the collector 6 which is shown as comprising a hollow conical inner member 87 for collecting electrons which member is surrounded by a second conical hollow member 88 contained within a cylindrical casing 89. Cooling fluid is introduced via pipe 90 into a passage 91 within a cap 92 attached to the upper end of the casing 89 and thence this fluid flows into the interior of conical member 88 and in surrounding relation to conical member 87. Such fluid flowing between the two conical members serves to absorb the heat generated in the walls of conical member 87 by the electrons striking this member. The cooling fluid flows downwardly over the member 87 and under the lower edge of member 88 as shown by the arrows in Fig. 9 and thence upwardly exterior to the conical member 88 and within casing 89 and outwardly through passage 93 to exit pipe 94. The lower edge portion of conical member 88 is shown retained in spaced relation with respect to conical member 87 by means of three buttons 95 as especially shown in Figs. 9 and 10. An annular vitreous seal 96 is shown connected through Kovar ring 97, stainless steel ring 98 to copper ring 99 supporting the casing 89 and cap 92 thereby serving to insulate the collector from the remainder of the tube and enabling any desired potential to be applied to the collector. The seal 96 is supported upon the main part of the tube as by copper sleeve 100, stainless steel ring 101 and Kovar ring 102.

In order to concentrate the magnetic focusing field in the immediate vicinity of the beam at the throat 72, a magnetic steel plate or pole piece 103 is attached to cylindrical accelerating plate 70 adjacent resonator 3. A similar plate or pole piece 104 is attached to plate 83 concentrating the field adjacent the collector 6, such magnetic focusing field being set up by coils 105 through 107. To effect tuning of resonator 3, three threaded rods 108 spaced 120° apart extend through plates 70, 103 and 76 and have nuts thereon, the adustment of which will serve to vary the dimensions of resonator 3 by deflecting the lower corrugated flexible end of this resonator. The loop in pipe 74 accommodates this motion. Similarly, three threaded rods 109 extend through plates 76, 80, 83 and 104 and have nuts thereon for selectively tuning either resonator 4 or resonator 5 depending upon which nuts are tightened or loosened.

In operation, the uniform electron beam leaving cathode button 26 as focused by focus shield 27 and magnet coils 105, 106 and 107 passes through throat 72 of accelerating plate 70 and through gaps 40, 41 and 42 of resonators 3, 4 and 5 in succession. Incoming signals supplied via concentric lines 10, 11 and 7, 8 and loop 9 are amplified in resonators 3, 4 and 5 and pass outwardly through loop 17 and concentric line 15, 20 into waveguide 19 for utilization, as for feeding to an antenna, owing to the novel cathode construction producing a straight uniform beam together with the use of the magnetic focusing enhanced by use of plates 103 and 104, a straight beam is obtained effecting highly efficient coaction with the electric component of the standing fields within the resonators at gaps 40, 41 and 42. The location of these gaps centrally within the relatively long resonators enables the use of gaps of minimum width, also the external edges of the gaps are beveled thus reducing the possibility of multipactor action to a minimum while at the same time maintaining a high shunt impedance for the resonators so that large energy interchange takes place between the beam and the fields of the resonators resulting in high gain of the amplifier tube and large output powers. The use of the specially constructed input and output concentric lines prevents damaging of the input and output seals so that large powers can be handled without injury to the tube. The effective cooling of the resonator drift tubes and of the collector also prevents injury to the tube and over heating of the same regardless of powers handled.

Since many changes could be made in the above construction and many apparently widely different embodiments of this invention could be made without departing from the scope thereof, it is intended that all matters contained in the above description or shown in the accompanying drawings shall be interpreted as illustrative and not in a limiting sense.

This application is a division of U.S. application Serial No. 370,568, filed July 27, 1953, now U.S. Patent No. 2,879,440.

What is claimed is:

1. In an electron discharge device, a cathode structure comprising an emitting button, an annular focus shield positioned in front of said button for aiding in focusing a beam leaving the button, a spiral type filament having variable spaced convolutions spaced from said button and in the rear of the same for continuously uniformly heating said button by electron bombardment, an annular heat shield surrounding said button and having flexible substantially tangentially extending fingers tangentially carrying said button thereby enabling expansion and contraction of said button without misalignment thereof, and a cylindrical support for said heat shield and spaced therefrom.

2. In an electron discharge device as defined in claim 1 wherein a second cylindrical support is provided surrounding said first named cylindrical support and carrying said focus shield, and a third combined cylindrical support and focus shield interposed between said filament and said first cylindrical support, said support serving to firmly position the focus shield, the cathode button and the filament.

3. In an electron discharge device as defined in claim 1 wherein said heat shield has pivoted rods carried thereby, said rods projecting into said button for aiding in supporting the latter.

4. In combination: a cavity resonator; and a cavity resonator coupling comprising a concentric line provided with a closing seal for maintaining a vacuum within said resonator and a wave trap providing a shorting section a half wave length along said line from said seal for producing a potential minimum at said seal during the operation of said resonator.

5. The combination of claim 4 wherein said wave trap comprises a cylindrical member surrounding said concentric line and said seal for protecting the latter against mechanical injury, the inner conductor of said conductor of said line extending through said seal and within said cylindrical surrounding member to constitute a concentric line terminal therewith.

6. The combination of claim 5 wherein said concentric line inner and outer conductors are connected to said seal through the intermediary of line sections of progressively lesser coefficient of thermal expansion thus protecting said shield against rupture due to excessive expansion and contraction of the inner and outer conductors.

7. In an electron discharge device, the combination comprising a cathode button, and a spiral type filament spaced from said button for effecting the heating of the button, said filament being wound so that its convolutions are closer together in the region of the periphery of the button than in the region of the center thereof for causing continuous uniform heating of said button over its entire area.

8. The combination of claim 7 wherein said button is heated by electron bombardment from said filament.

9. In an electron discharge device, the combination comprising a cathode button adapted to be heated by electron bombardment, a spiral type filament spaced from said button for continuously emitting electrons which bombard said button and heat the same, and a defocusing electrode positioned between said filament and said button and substantially centrally thereof for reducing the number of electrons striking the central portion of said button thereby aiding in effecting continuous uniform heating of said button.

10. The combination of claim 8 further comprising a cylindrical focusing shield surrounding said filament and projecting toward said button but spaced therefrom for aiding said electrode in effecting continuous uniform heating of said button.

References Cited in the file of this patent

UNITED STATES PATENTS

| | | |
|---|---|---|
| 2,410,822 | Kenyon | Nov. 12, 1946 |
| 2,466,064 | Wathen et al. | Apr. 5, 1949 |
| 2,581,243 | Dodds | Jan. 1, 1952 |
| 2,888,591 | Schmidt et al. | May 26, 1959 |